United States Patent
Kapich

Patent Number: 5,937,832
Date of Patent: Aug. 17, 1999

[54] CONTROL SYSTEM FOR HYDRAULIC SUPERCHARGER SYSTEM

[76] Inventor: Davorin D. Kapich, 3111Serrano Dr., Carlsbad, Calif. 92009

[21] Appl. No.: 08/758,055

[22] Filed: Nov. 27, 1996

[51] Int. Cl.$^6$ .................................................... F02B 39/08
[52] U.S. Cl. ........................................... 123/561; 123/565
[58] Field of Search .................................... 123/561, 565; 60/607, 608

[56] References Cited

U.S. PATENT DOCUMENTS

| | | | |
|---|---|---|---|
| 4,803,969 | 2/1989 | Hiereth et al. | 123/561 |
| 5,421,310 | 6/1995 | Kapich | 123/561 |
| 5,724,949 | 3/1998 | Liang | 123/561 |

FOREIGN PATENT DOCUMENTS

| | | | |
|---|---|---|---|
| 3008181 | 9/1981 | Germany | 60/608 |
| 58-10114 | 1/1983 | Japan | 60/608 |
| 3-249330 | 11/1991 | Japan | 60/608 |

*Primary Examiner*—Michael Koczo
*Attorney, Agent, or Firm*—John R. Ross; John R. Ross, III

[57] ABSTRACT

A control system for an hydraulic supercharger system. The control system is specially adapted to control a supercharger system comprising: (A) an hydraulic pump; (B) a supercharger comprising: an hydraulic turbine drive and a compressor driven by the hydraulic turbine drive; (C) a main hydraulic piping means providing a hydraulic circulation loop for hydraulic fluid to flow from said pump, to drive said hydraulic turbine drive, and back to said pump; and (D) a supercharger bypass system comprising a controlled bypass valve and a piping means to permit a portion of said hydraulic fluid to bypass said supercharger turbine drive. The control system includes a solenoid arranged to close and partially or fully open the controlled bypass valve. The solenoid may be controlled by a pressure switch connected to sense hydraulic pressure and to apply a voltage to said solenoid to open or close said valve upon said hydraulic pressure reaching a predetermined value. Since the hydraulic pressure increases with engine speed, it is a simple matter to adjust the control system to provide for the hydraulic fluid to drive the supercharger or to bypass the supercharger at any predetermined ranges of engine speed. The bypass valve may also be controlled based on engine throttle position. In another preferred embodiment where the turbocharger system comprising an air flow check valve which opens when a turbocharger is providing sufficient air to the engine, the bypass valve is also subject to control based on the position of the check valve, so that the hydraulic supercharger can be substantially bypassed when the turbocharger is able provide sufficient air to the engine.

9 Claims, 6 Drawing Sheets

CONTROL SYSTEM FOR HYDRAULIC SUPERCHARGER SYSTEM

TECHNICAL FIELD

This invention relates to hydraulic drives for driving supercharger systems and especially to controls for such systems.

BACKGROUND OF THE INVENTION

Superchargers are air pumps or blowers in the intake system of an internal combustion engine for increasing the mass flow rate of air charge and consequent power output from the engine. A turbosupercharger (normally called a turbocharger) is a supercharger with a turbine driven by engine exhaust gas. When superchargers are driven mechanically from the shaft of the internal combustion engine, a speed increasing gear box or belt drive is needed. Such superchargers are limited to a relatively low rotating speed and are large in size. Paxon Blowers and Vortech Engineering Co. are marketing such superchargers. Fixed gear ratio superchargers suffer from two very undesirable features: 1) there is a sharp decrease in boost pressure at low engine RPM because boost pressure goes generally to the square of the speed of rotation, and 2) it is generally difficult to disconnect the supercharger from the engine when the supercharger is not needed.

Most automobiles are not supercharged, i.e., air is sucked into the engines merely by vacuum created by action of the engine's pistons. Some selected models are turbocharged or supercharged for improved engine performance. Most diesel engine driven trucks and buses are turbocharged. At low engine speed many of these engines suffer from a lack of air flow especially during periods of acceleration. During these periods particulate emission can be a severe problem and attempt to avoid the emissions tend to result in poor acceleration.

The Applicant has been issued U.S. Pat. No. 5,471,965 for a very high speed radial inflow hydraulic turbine useful for motor vehicle supercharging and U.S. Pat. No. 5,421,310 for a hydraulic supercharging system. Both of these patents are hereby incorporated by reference herein. In typical situations, hydraulic superchargers are most effectively used on motor vehicles in conjunction with turbochargers. Over certain ranges the turbocharger can handle efficiently the job of supplying air to the engine and over certain ranges it needs the help of the supercharger. Maximum effectiveness is provided when a good simple control system is provided which takes advantages of the best attributes of both the supercharger and the turbocharger. It is in some cases desirable to be able to change the supercharging pressure into the engine in a manner independent of engine speed.

What is needed, is a good simple system for controlling supercharger performance on typical motor vehicles.

SUMMARY OF THE INVENTION

The present invention provides a control system for a hydraulic supercharger system. The control system is specially adapted to control a supercharger system comprising: (A) a hydraulic pump; (B) a supercharger comprising: a hydraulic turbine drive and a compressor driven by said hydraulic turbine drive; (C) a main hydraulic piping means providing a hydraulic circulation loop for hydraulic fluid to flow from said pump, to drive said hydraulic turbine drive, and back to said pump; and (D) a supercharger bypass system comprising a controlled bypass valve and a piping means to permit a portion of said hydraulic fluid to bypass said supercharger turbine drive. The control system includes a solenoid valve arranged to close and partially or fully open the controlled bypass valve. The solenoid valve may be controlled by a pressure switch connected to sense hydraulic pressure and to apply a voltage to said solenoid valve to open or close said valve upon said hydraulic pressure reaching a predetermined value. Since the hydraulic pressure increases with engine speed, it is a simple matter to adjust the control system to provide for the hydraulic fluid to drive the supercharger or to bypass the supercharger at any predetermined ranges of engine speed. The bypass valve may also be controlled based on engine throttle position. In another preferred embodiment where the turbocharger system comprising an air flow check valve which opens when a turbosupercharger is providing sufficient air to the engine, the bypass valve is also subject to control based on the position of the check valve, so that the hydraulic turbocharger can be substantially bypassed when the turbosupercharger is able provide sufficient air to the engine.

DETAILED DESCRIPTION OF PREFERRED EMBODIMENTS

Preferred embodiments of the present invention can be described by reference to the drawings.

Hydraulic Supercharging System

Figure 1:
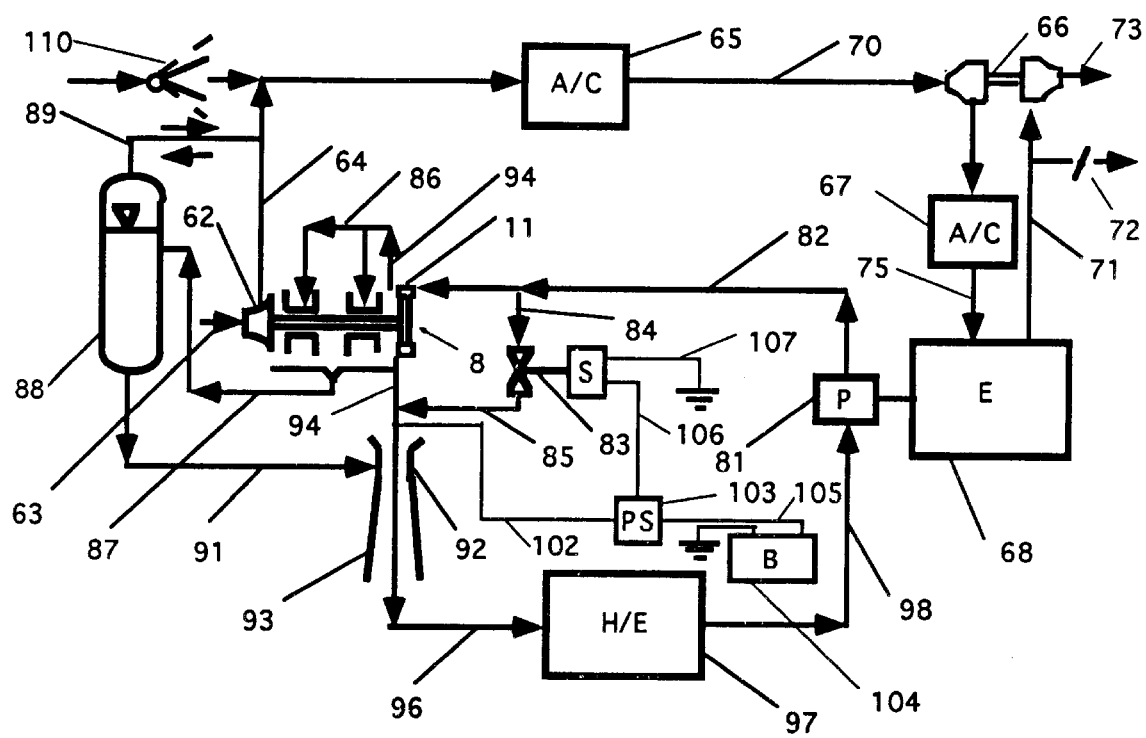
FIG. 1 is a layout showing the functioning of a first control system for a supercharger-turbocharger system.

FIG. 1 shows a one-stage supercharger hydraulic system. In this preferred embodiment, engine 68 is a standard Caterpillar 3306 turbo-diesel truck engine producing useful mechanical power. Hydraulic pump 81 is driven by engine 68 and the pump is pressurizing, at the rate of about 23 gallons per minute, hydraulic fluid to a pressure of approximately 1200 psi into line 82 which channels the hydraulic fluid to turbine drive 8 and via line 84 to solenoid operated bypass valve 83. Hydraulic pump 81 is a commercially available hydraulic pump such as Parker Model PZG 600. Supercharger compressor wheel 62 is a standard commercially available TO-4 compressor which is driven by turbine wheel 11 as shown in FIG. 1.

Turbine discharge line 94 is connected to bypass valve discharge line 85. The amount of flow from turbine wheel 11 discharge is reduced by the bearing lubricant flow of approximately 1.5 GPM which flows through line 86. The combined flow from the bypass valve 83 discharge and turbine wheel 11 net discharge flow are forced to flow through throat 92 of venturi nozzle 93. Throat 92 diameter is sized to provide a drop in static pressure at the throat 92 location of about 60 psi. This location serves as the return point for the lubricant flow supplied to supercharger bearings via line 86. The bearings drain line 87 is connected to expansion tank 88 which provides for thermal expansion of the hydraulic fluid and as a degassing point for the hydraulic fluid. The expansion tank is further connected via line 91 to throat 92. Bearing lubricant flow from line 91 joins at that point the combined turbine discharge and bypass valve discharge flows, flowing further through the diffuser section of venturi nozzle 93 where about 80 percent of the throat 92 dynamic head of 60 psi is recovered, thus raising the static pressure in line 96 to about 50 psi above throat 92 static pressure.

Expansion tank 88 can be vented via line 89 into supercharger discharge line 64, as shown, or turbocharger discharge line 75, or it can be vented to the atmosphere. The expansion tank pressure being essentially at throat 92 pressure, sets the pressure levels for the entire system. The hydraulic fluid flows from line 96 into oil cooler 97 where the heat losses are rejected to ambient. Hydraulic fluid flows further via line 98 back into hydraulic pump 81.

Pressurized air flowing through line 64 is typically after-cooled in the air to air aftercoolers 65 and 67 where large amount of heat of compression is rejected to ambient. Relatively cool pressurized air is further charged into engine 68. Line 71 is the engine exhaust pipe.

First Control System for Hydraulic Supercharging System

A first control system for the above supercharger-turbocharger system is comprised of solenoid operated bypass valve 83, hydraulic pressure line 102, pressure switch 103, accumulator battery 104, electric lines 105 and 106 and airflow check valve 110, all as shown in FIG. 1. Air flow check valve 110 is lightly spring loaded to close at low engine air flows and open at high engine air flows.

Pressure switch 103 (for example, Model FRG 22J36 supplied by Square D Corp. and available through several well known catalog sources) senses the fluid pressure at the inlet of venturi 93. The fluid pressure at this location is approximately a function of the square of the hydraulic fluid flow which is approximately proportional to engine speed. At low engine speed it is desirable to provide high supercharger flow to supplement turbocharger flow which is low at low engine speed. However when the engine is running at high speed the turbocharger is typically capable of providing all the air needed by the engine. Therefore, pressure switch is set to open solenoid operated valve 83 when the pressure in line 102 reaches a sufficiently high value corresponding to about 50 percent of full engine speed. It is also set to close solenoid operated bypass valve when the oil pressure drops to a pressure corresponding to an engine speed of about 30 percent of full engine speed. The turbocharger is shown at 66 in FIG. 1. Turbine exhaust line is shown at 73 and a turbine bypass valve is shown at 72.

Second Control System for Hydraulic Supercharging System

Figure 2:
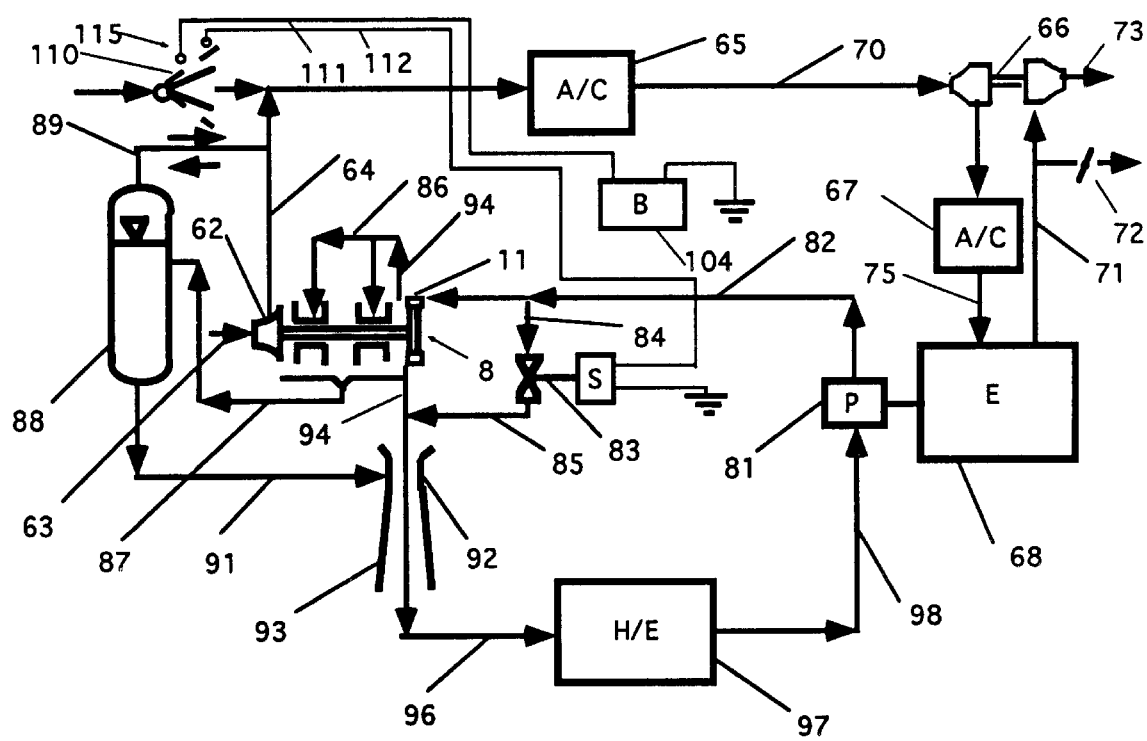
FIG. 2 is a layout showing the functioning of a second control system for a supercharger-turbocharger system.
Figure 3:
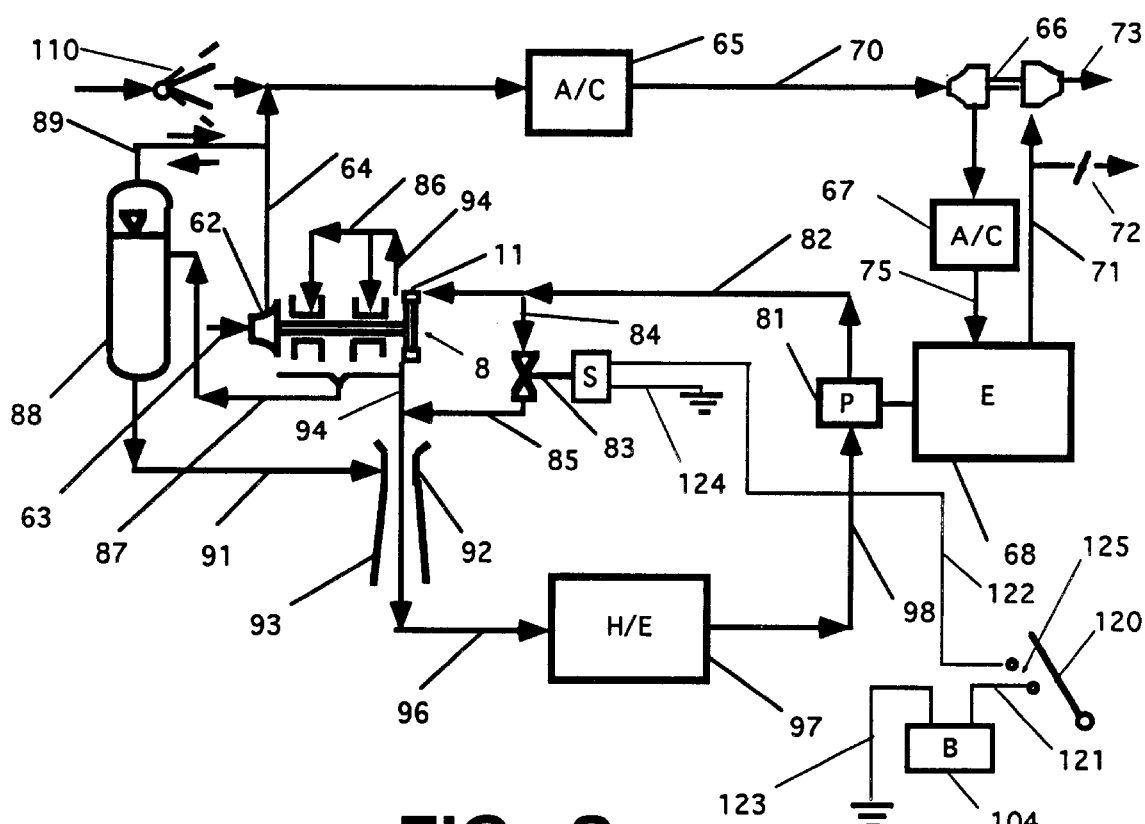
FIG. 3 is a layout showing the functioning of a third control system for a supercharger-turbocharger system.

A second control system for the above supercharger-turbocharger system is comprised of solenoid operated bypass valve 83, accumulator battery 104, airflow check valve 110, electrical contacts 115, electric lines 111 and 112, all as shown in FIG. 2. In this embodiment, bypass valve 83 is always closed except when the engine 68 is running at a speed high enough so that turbocharger 66 is sucking sufficient air through check valve 110 that a contact connected to the the valve flapper opens contacts 115 which causes battery voltage to be disconnected from solenoid valve 83 opening the valve. Contacts 115 are adjustable so that the operation of valve can be set at any desired engine speed. Typically the contacts will be set to open valve 83 at about 50 percent of full engine speed. When the engine speed is reduced to below about 50 percent check valve begins to close, closing contacts 115 which disconnects the battery voltage from valve 83 causing it to close which in turn sends hydraulic fluid flow through supercharger turbine 8.

Third Control System for Hydraulic Supercharging System

A third control system for the above supercharger system is comprised of solenoid operated bypass valve 83, accumulator battery 104, throttle position switch 120, contacts 125 and electric lines 121, 122, 123 and 124. In this case the throttle position determines when solenoid valve is open and closed. Contacts 125 are adjustable and are adjusted to cause valve 83 to close when the throttle is sufficiently engaged. Since the throttle position is roughly proportional to fuel flow, this provides a boost in air to the engine virtually simultaneously with the increase in fuel flow. The contacts typically will be set to cause valve 83 to be closed at throttle positions greater than about 30 percent and open at throttle positions below about 30 percent.

Fourth Control System for Hydraulic Supercharging System

Figure 4:
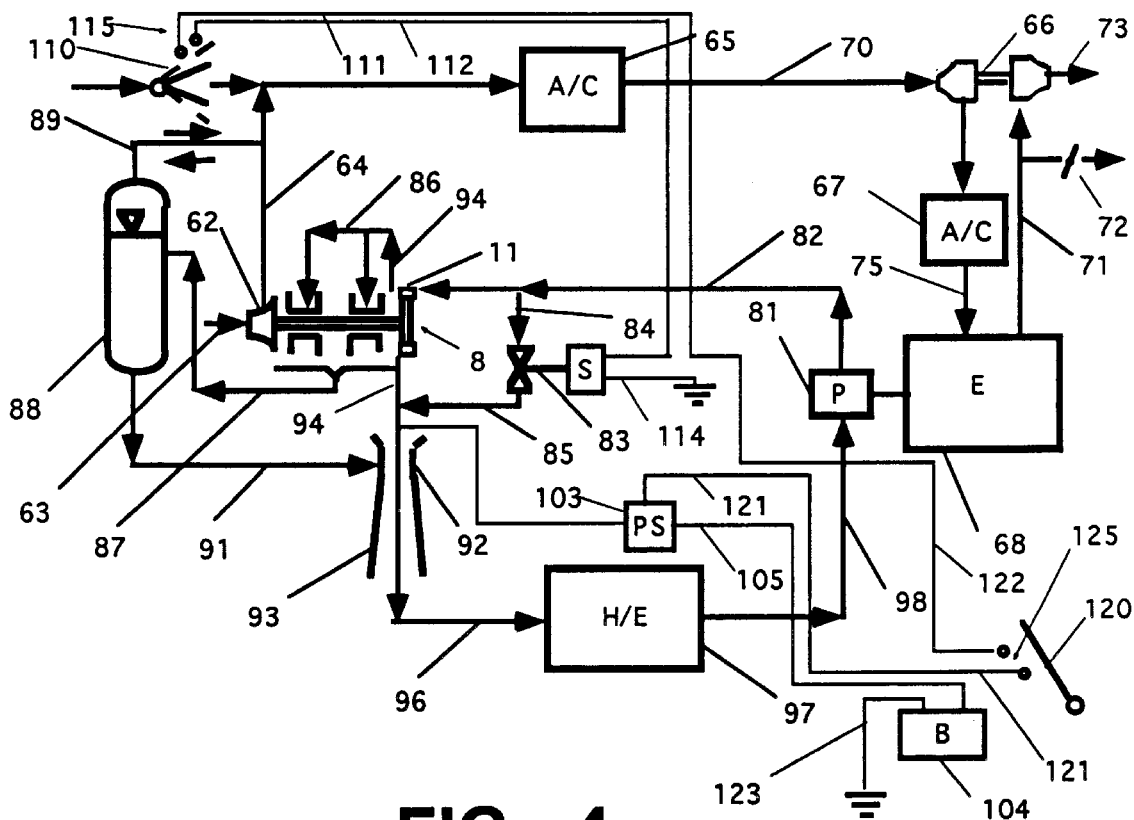
FIG. 4 is a layout showing the functioning of a fourth control system for a supercharger-turbocharger system combining features shown in FIGS. 1, 2 and 3.
Figure 5:
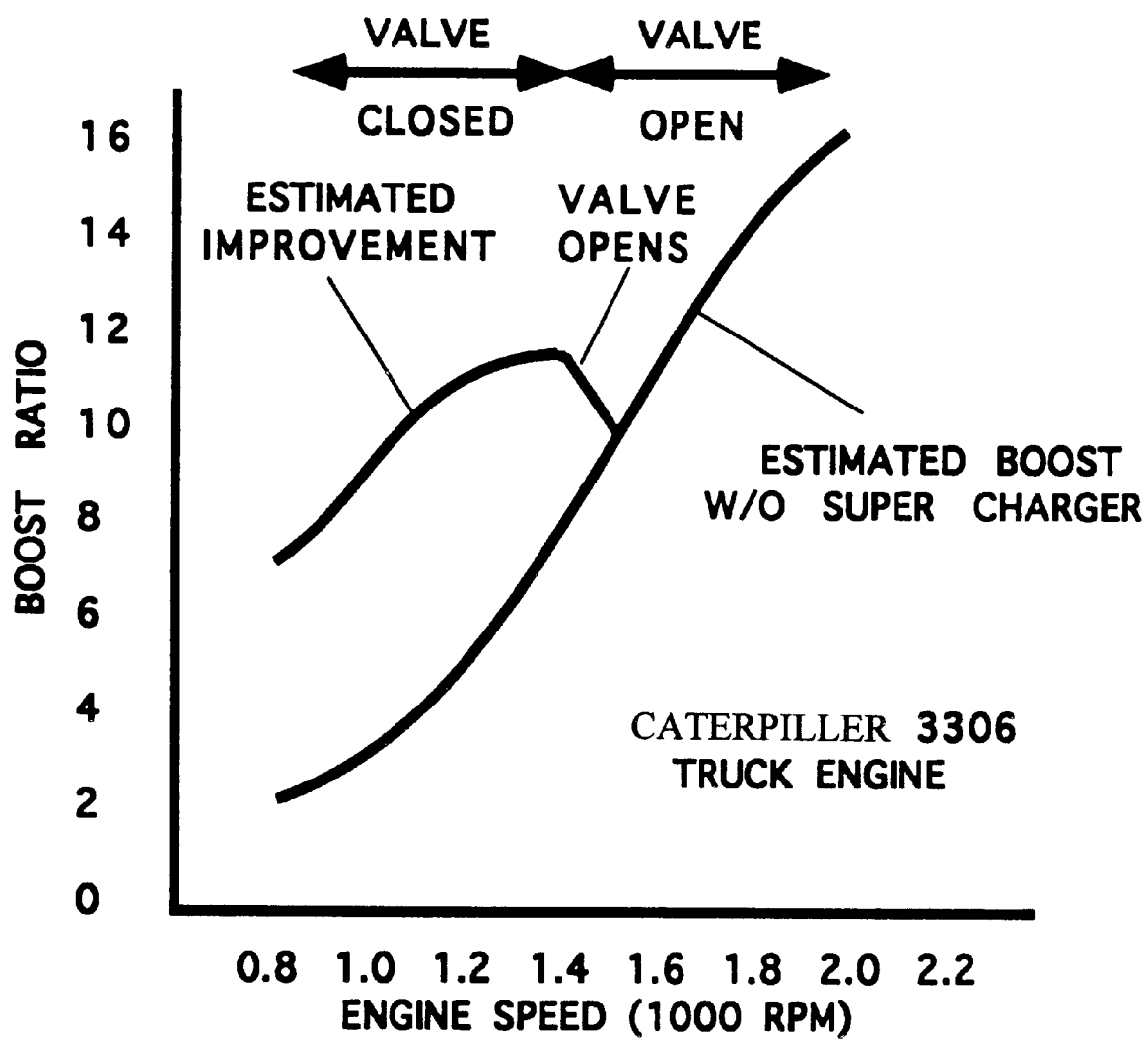
FIG. 5 is a chart showing improved performance as a result of use the present invention on a typical diesel truck engine.

A fourth control system as shown in FIG. 4 for the above supercharger-turbocharger system is comprised of most of the control components referred to in the first through third control systems. However, the control components are arranged to provide finer control of valve 83. Under this control system, valve 83 is closed except when:

1) the oil pressure switch senses an engine speed in excess of a set value (such as about 50 percent),
 2) the throttle position is less than a set value (such as about 30 percent) and
 3) the flapper of check valve is open to less than a set value (such as about 50 percent).

This control system will provide supercharger flow at low engine speeds, high engine loads and in response to a throttle position responding to acceleration or deceleration command by the engine operator.

Figure 6:
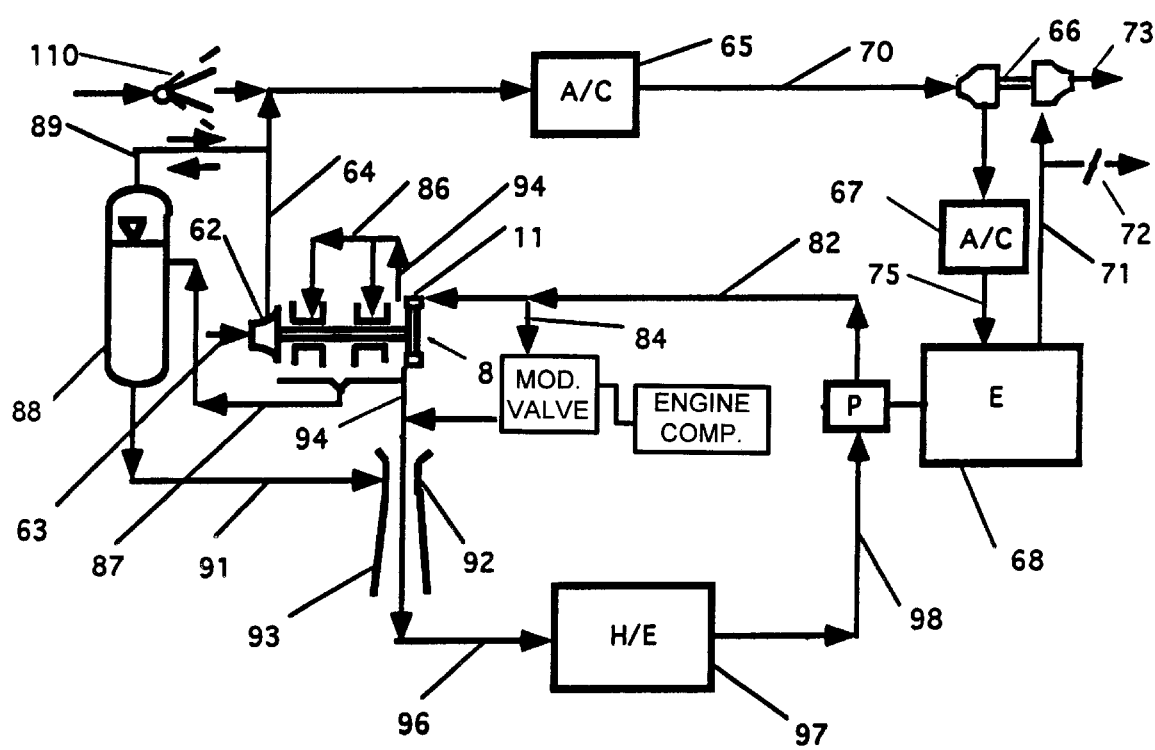
FIG. 6 shows an alternative layout using a modulating bypass valve.

It should be understood that the specific form of the invention illustrated and described herein is intended to be representative only, as certain changes may be made therein without departing from the clear teachings of the disclosure. For example, valve 83 may be sized to provide a substantial restriction to the bypass flow. This basically would provide for "high boost" and "low boost" control positions. Also, a second bypass valve could be added in parallel with valve 83 in order to provide a better stepwise control of the hydraulic system. Also, a pressure compensated electroproportionately controlled modulating bypass valve (such as Model EPFR 1-10/16, commercially available from Rupes Hydraulics with offices in San Marcos, Calif.) can be directly controlled by an on-board engine computer used for controlling fuel flow See FIG. 6. These on-board engine computers are currently available on a limited number of engines.

Accordingly, reference should be made to the following appended claims in determining the full scope of the invention.

I claim:

1. A hydraulic supercharger system with a control system comprising:

A) an hydraulic pump;

B) a supercharger comprising:
1) an hydraulic turbine drive and
2) a compressor driven via a supercharger shaft supported by shaft bearings;

C) a main hydraulic piping means providing a hydraulic circulation loop for hydraulic fluid to flow from said pump to drive said hydraulic turbine drive, and back to said pump;

D) a supercharger bypass system comprising:
1) a piping means to permit a portion of said hydraulic fluid to bypass said supercharger turbine drive;
2) a controlled bypass valve comprising a solenoid arranged to open and close said controlled bypass valve; and
3) a pressure switch arranged to control said solenoid and comprising a pressure detector connected to sense hydraulic pressure at a location in said main hydraulic piping means where said hydraulic pressure is a function of engine speed;

E) an expansion tank and a venturi unit having a low pressure throat section; and F) a lubrication piping means providing a lubrication route for a portion of said hydraulic fluid flow from said turbine drive to said bearings, to said expansion tank and to said low pressure throat section of said venturi unit.

2. A control system as in claim 1 wherein said hydraulic supercharger system also comprises a turbosupercharger and an air flow check valve arranged to open when said turbosupercharger attains a predetermined speed and said control system further comprises an air flow check valve switch arranged to open or close said solenoid controlled bypass valve when said air flow check valve is opened by a predetermined extent.

3. A control system as in claim 2 and further comprising a throttle switch for sensing a throttle position of an internal combustion engine, said throttle position being arranged to open or close said solenoid controlled bypass valve when said throttle is opened to a predetermined position.

4. A control system as in claim 1 and further comprising a throttle switch for sensing a throttle position of an internal combustion engine, said throttle position being arranged to open or close said solenoid controlled bypass valve when said throttle is opened to a predetermined position.

5. A hydraulic supercharger system comprising:

(A) a hydraulic pump;

(B) a supercharger comprising:
1) bearings,
2) a hydraulic turbine drive and
3) a compressor driven by said hydraulic turbine drive;

(C) a hydraulic venturi unit defining a main inlet, an outlet and a low pressure throat section;

(D) an expansion tank;

(E) a main hydraulic piping means providing a hydraulic circulation loop for hydraulic fluid to flow from said pump, to drive said hydraulic turbine drive, to said main inlet of said venturi unit, through said venturi unit, to said venturi outlet and back to said pump;

(F) a supercharger bypass system comprising a controlled bypass valve and a piping means to permit a portion of said hydraulic fluid to bypass said supercharger turbine drive; and (G) a lubrication piping means providing a lubrication route for a portion of said hydraulic fluid flow from said turbine drive to said bearings to said expansion tank and to said low pressure throat section of said venturi unit;

(H) a control system for controlling said controlled bypass valve comprising:
1) a solenoid arranged to open and close said controlled bypass valve and
2) a pressure switch connected to sense a speed indicating hydraulic pressure and to apply a voltage to said solenoid to open or close said solenoid controlled bypass valve upon said hydraulic pressure reaching a predetermined value.

6. A method of controlling an hydraulic supercharger system comprising: (A) bearings; (B) an hydraulic pump; (C) a supercharger comprising: an hydraulic turbine drive and a compressor driven by said hydraulic turbine drive; (D) a main hydraulic piping means providing a hydraulic circulation loop for hydraulic fluid to flow from said pump, to drive said hydraulic turbine drive, and back to said pump; (E) a supercharger bypass system comprising a controlled bypass valve and a piping means to permit a portion of said hydraulic fluid to bypass said supercharger turbine drive; (F) an expansion tank; (G) a venturi unit with a low pressure throat section; and (H) a lubrication piping means providing a lubrication route for a portion of said hydraulic fluid from said turbine drive to said bearings to said expansion tank and to said low pressure throat section of said venturi unit; said method comprising the steps of:

1) opening said controlled bypass valve when a pressure switch connected to sense hydraulic pressure indicates that hydraulic pressure is greater than a first predetermined value, and
2) closing said controlled bypass valve when a pressure switch connected to sense hydraulic pressure indicates that hydraulic pressure is less than a second predetermined value.

7. A method as in claim 6 wherein said first and second predetermined values are the same value.

8. A method as in claim 6 wherein said hydraulic system comprises a venturi positioned downstream of said hydraulic turbine and said bypass valve and wherein said pressure switch is connected to sense said hydraulic pressure at a location downstream of said hydraulic turbine and said bypass valve and upstream of said venturi.

9. A control system for a hydraulic supercharger system comprising: (A) bearings; (B) an hydraulic pump; (C) a supercharger comprising: an hydraulic turbine drive and a compressor driven by said hydraulic turbine drive; (D) a main hydraulic piping means providing a hydraulic circulation loop for hydraulic fluid to flow from said pump, to drive said hydraulic turbine drive, and back to said pump; (E) a supercharger bypass system comprising a controlled bypass valve and a piping means to permit a portion of said hydraulic fluid to bypass said supercharger turbine drive; (F) an expansion tank; (G) a venturi unit with a low pressure throat section; and (H) a lubrication piping means providing a lubrication route for a portion of said hydraulic fluid from said turbine drive to said bearings to said expansion tank and to said low pressure throat section of said venturi unit; said control system comprising:

1) a pressure compensated, electro-proportionally controlled modulating bypass valve, and
2) an on-board engine computer programmed to control said bypass valve.

* * * * *